United States Patent Office 3,159,643
Patented Dec. 1, 1964

---

3,159,643
6-METHYLENE-3-OXO-Δ⁴ STEROIDS AND PROCESS FOR PREPARATION OF SAME
David Neville Kirk and Vladimir Petrow, both of London, England, assignors to The British Drug Houses Limited
No Drawing. Filed Feb. 28, 1962, Ser. No. 176,423
Claims priority, application Great Britain, May 8, 1961, 16,703/61
13 Claims. (Cl. 260—397.3)

This invention is for improvements in or relating to organic compounds and has particular reference to 3-oxo-Δ⁴-steroids containing a methylene substituent at $C_6$.

It is an object of the present invention to provide a new and general process for the preparation of 6-methylene-3-oxo-Δ⁴-steroids of the androstane, 19-norandrostane, D-homoandrostane, pregnane, 19-norpregnane and spirostane series.

It is another object of the present invention to provide the following new 6-methylene-3-oxo-Δ⁴-steroids:

6-methylene-17α-methyltestosterone, which is of value on account of its anabolic/androgenic activity; in addition the compound has claudogenic activity and may be expected to inhibit the growth of androgen-responsive tumours, 6 - methylenecortisone - 17,21 - acetonide, which is of value as an intermediate for the preparation of 6α-methylcortisone into which it may be converted by catalytic hydrogenation and acidic removal of the acetonide residue, 6-methylene-19-nortestosterone, its acetate, propionate and β-phenylpropionate which are of value on account of their favourable anabolic/androgenic index, 6-methyleneandrostenedione which is of value as an intermediate for the partial synthesis of such compounds as 6-methylenetestosterone into which it may be converted by methods developed in prior art for the 6-desmethylene analogues, 6 - methylenedesoxycorticosterone, 17α - acetoxy - 21-fluoro-6-methylenepregn-4-ene-3,20-dione and 6-methylenecortisone 17,21-diacetate which are of value on account of their hormonal and anti-hormonal properties. Thus the two latter compounds, for example, have progestational and ovulation-inhibiting properties.

6-methylenetestosterone 17β-phenylpropionate which is of value on account of its androgenic/anabolic activity.

As revealed in our copending application No. 150,177 the 6-methylene-3-oxo-Δ⁴-group of steroidal materials are of outstanding importance in the field of steroid technology. Many of them possess valuable biological properties which render them of value in, for example, the veterinary field. Thus 6-methylene testosterone and its esters are potent anabolic/androgenic agents. The 6-methylene derivatives of progesterone, 16α-methylprogesterone, 17α-acetoxyprogesterone, 17α-acetoxy-16-methyleneprogesterone and 17α-acetoxy-16α-methylprogesterone are potent progestational agents and possess ovulation-inhibiting properties. In addition, catalytic hydrogenation of these compounds, followed by treatment with a catalytic quantity of hydrochloric acid in ethanol converts them into the technically valuable 6α-methyl-3-oxo-Δ⁴-steroids which are well-known to those skilled in the art and which find employment in clinical medicine (e.g. medroxy-progesterone acetate, (17α-acetoxy-6α-methylpregn-4-ene-3,20-dione) 6α-methylprednisolone, 6α-methylprednisone, 6α,21-dimethylethisterone).

We have now made the surprising discovery that quaternary derivatives and in particular salts derived from the 3-enol ethers of 3-oxo-Δ⁴-6-aminomethyl steroids of the androstane, 19-norandrostane, D-homoandrostane, pregnane, 19-norpregnane and spirostane series including Formula I below pass into the corresponding 6-methylene-3-oxo-Δ⁴-steroids including Formula II below, the process of the invention involving the elimination of the units N, $R^I$, $R^{II}$, $R^{III}$, $R^{IV}$ [and X] from the amine salt starting material.

According to the present invention there is provided a process for the preparation of 6-methylene-3-oxo-Δ⁴-steroids of the androstane, 19-norandrostane, pregnane, 19-norpregnane and spirostane series including Formula II below

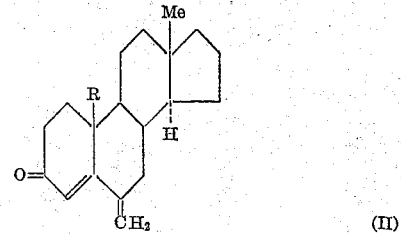

(II)

where R is Me or H which process comprises contacting with an aqueous solution or organic solvent a quaternary derivative derived from a 3-enol ether of a corresponding 3-oxo-Δ⁴-6-aminoethyl steroid including Formula I below

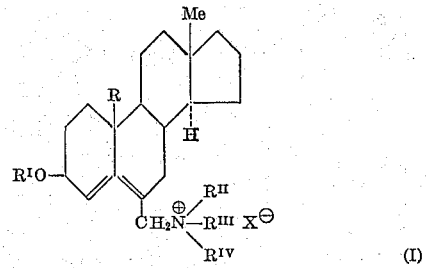

(I)

in which

X is an anion
R is Me or H
$R^I$ is alkyl, hydroxyalkyl, cycloalkyl or aralkyl
$R^{II}$ is alkyl, cycloalkyl, aryl or aralkyl when $R^{III}$ and $R^{IV}$ are H
$R^{II}$ is alkyl, $R^{III}$ is aryl, aralkyl or alkyl and $R^{IV}$ is H
$R^{II}$, $R^{III}$ and $R^{IV}$ are alkyl
$R^{II}$ and $R^{III}$ together form a pyrrolidine, piperidine or morpholine ring and $R^{IV}$ is alkyl or oxygen.

When $R^{IV}$ is oxygen the grouping $.NR^{II}R^{III}R^{IV}$ will be an N-oxide grouping of the type

which may be expected in aqueous organic solvent solutions to exist in the hydrated form

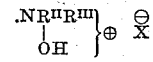

The steroid starting material may be contacted with water either alone or preferably in admixture with an organic solvent. The organic solvent is conveniently a hydroxylic solvent such as a lower aliphatic alcohol employed in order to increase the solubility of the steroidal starting material. The reaction mixture is preferably heated to accelerate the elimination of the groups N, $R^I$, $R^{II}$, $R^{III}$, $R^{IV}$ [and X] from the steroid starting material. The steroid starting material may be dissolved or suspended in an organic solvent. It is, however, desirable that such solvent should not be anhydrous as under anhydrous conditions the yields are very greatly reduced.

As mentioned hereafter, the steroid starting material is preferably a salt of a quaternary amine having the formula

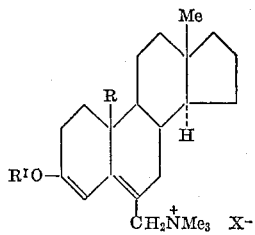

(i.e. Formula I where $R^{II}$, $R^{III}$ and $R^{IV}$ are methyl). The anion X may be I, Br or $MeSO_4$ in the preferred case.

The steroid starting materials in the form of a quaternary salt may be conveniently heated at 100° C. in water with or without methanol.

It will be apparent to those skilled in the art that the starting materials of the present invention including Formula I fall into the following three broad categories:

*Category A.*—Salts of quaternary amines of the type

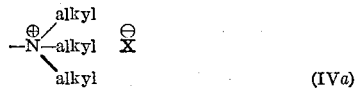

*Category B.*—Salts of tertiary amines of the type

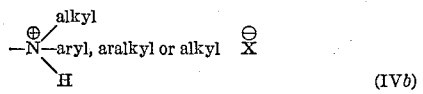

*Category C.*—Salts of secondary amines e.g. of the type

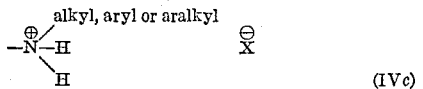

Salts of quaternary amines of Category A form the preferred group of starting materials. In particular, salts of quaternary amines of Category A of the type

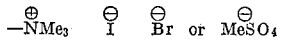

are preferred owing to their superior availability, more economical cost of preparation, generally adequate solubility and the facility with which they undergo the elimination reaction to yield 6-methylene-3-oxo-$\Delta^4$-steroids including Formula II.

The preparation of salts of quaternary amines of Category A of the androstane, 19-norandrostane, pregnane, 19-norpregnane and spirostane series including Formula I is described in our copending application No. 168,827, filed January 25, 1962, now Pat. No. 3,084,159 and herein. The process involves the condensation of the 3-enol ether of a 3-oxo-$\Delta^4$-steroid (V) with the Vilsmeier reagent under anhydrous conditions, followed by the reduction in situ in the absence of moisture of the resulting iminium salt to give the tertiary amine (e.g. VI), followed by its quaternation by methods of prior art to yield the salt of the quaternary amine (e.g. VII). Dimethylformamide is the preferred basic component of the Vilsmeier reagent and 6-dimethylaminomethyl steroids including Formula VI form the preferred group of precursors of the salts of quaternary amines of Category A. Quaternations of the tertiary amine precursors of quaternary amines of

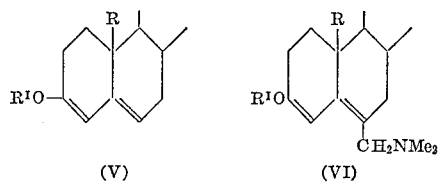

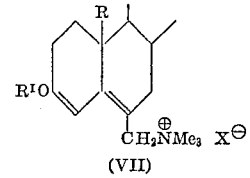

Category A including Formula VI may be effected by methods of prior art using various quaternating agents such as methyl halides or sulphate, toluene sulphonate ethyl, propyl, isopropyl, butyl, secbutyl, tert.-butyl iodides or bromides.

Other quaternating agents including heterocyclic quaternating agents will be apparent to those skilled in the art, but their utility does not exceed that of those described above and their use offers no advantage.

Methyl bromide and methyl sulphate form the preferred quaternating agents when methosalts including Formula (VII: X is Br or $MeSO_4$) are obtained. Such methosalts, in general, are sufficiently soluble in water or the organic solvent to render them eminently suitable for conversion into 6-methylenic 3-oxo-$\Delta^4$-steroids including Formula II when yields approaching quantitative figures may be obtained. In view of the excellence of these yields of 6-methylenic steroids and the general availability and cost of the materials required for the preparation of methosalts including Formula VII, their preference over other quaternary types will be readily apparent to those skilled in the art.

Preparation of methosalts including Formula VII may be accomplished by methods of prior art including reacting of the 6-dimethylaminomethyl steroidal precursor (VI) in an organic solvent such as methanol, acetone, ether, benzene, toluene, hexane or carbon tetrachloride with methyl bromide or methyl sulphate when virtually quantitative yields of methosalts may be obtained. Such methosalts are generally sufficiently pure for conversion into 6-methylenic steroids including Formula II and are preferably used directly without purification. They may be decomposed in situ when, for example, methanol is used as solvent.

In general excellent yields of 6-methylenic-3-oxo-$\Delta^4$-steroids including Formula II may be obtained by simply heating the quaternary salts (preferably the methosalts including Formula VII) in the aqueous solution or organic solvent. Addition of buffer systems may be advantageous in certain cases. In general, however, progressive addition of

ions leads to progressive lowering of yield of 6-methylenic product. The elimination reaction, however, is less susceptible to progressive addition of $H^+$ ions.

The solvent system may contain anions

added to assist the reaction, for example by replacing

in the steroidal starting material in order to increase the solubility of the steroidal starting material in the solvent system.

The solvent system may contain a buffer or other dissolved substance added with the object, for example, of reacting with a component or components derived from the elimination products of the reaction. Thus, for example, as the elimination reactionn leads to a product which may have an acidic reaction, it may be advisable to add a buffering agent such as sodium acetate to the solution when preparing 21-acylated 6-methylenic corticoids in order to minimise hydrolytic removal of the 21-acyloyl residue.

The quaternary salt and in particular the methosalt including Formula VII may be dissolved in the foregoing aqueous/solvent systems or may be suspended therein and the solution/mixture heated at 60 to 120° C., when conversion into the 6-methylenic steroid including Formula II occurs. When suspensions of the finely powdered quaternary salts in water or aqueous solvents are employed, the methylenic products including Formula II may separate from the reaction mixture in the nearly pure crystalline state thereby facilitating collection.

Conversion of quaternary salts including Formula I and in particular methobromides and methosulphates including Formula VII may be effected by heating in organic solvents (preferably non-anhydrous solvents) and mixtures thereof including:

Heating in dioxan at 100° C.,
Heating in dimethylformamide at 100° C.,
Heating in acetonitrile under reflux,
Heating in dimethylsulphoxide at 80° C.,
Heating in MeOH, ethanol, propanol, isopropanol,
Heating in a two-phase system such as water/benzene, when the 6-methylenic product is removed from the aqueous phase as it is formed. This method is particularly suitable for minimising hydrolysis of groups sensitive to prolonged treatment with hot water heating in MeOH/NaAc. This procedure is particularly suitable for corticoids as attack upon the side chain by the elimination products of the reaction is thereby minimised.

Conversion of quaternary salts including Formula I and in particular methobromides and methosulphates including Formula VII may be accomplished by heating in suspension in a solvent in which the steroidal starting materials are virtually insoluble providing such a solvent contains as a minor component a solvent in which the steroidal starting materials are soluble. Technical grade solvents usually contain enough water to render the elimination reaction highly effective under these experimental conditions. In addition, crude quaternary salts which have been air-dried likewise generally contain sufficient water, either in combination or/and in association to render the elimination reaction highly effective. Thus, for example, the crude methobromide derived from 17β-acetoxy-3-ethoxy - 6 - dimethylaminomethylandrosta-3,5-diene which has been dried in air at room temperature and pressure may be heated in suspension in toluene, when the quaternary salt undergoes the elimination reaction and the methylenic product passes into solution.

The preparation of tertiary amines required for conversion into salts of Category B is likewise described in our copending application No. 168,827 now Pat. 3,084,159. As before, it involves reacting the Vilsmeier reagent under anhydrous conditions with an enol ether (V) employing a dialkyl or an alkylaryl formamide as the basic component in the Vilsmeier reagent, followed by reduction in situ of the resulting iminium salt to give the 3-enol ether (VIII) of the 6-dialkyl or 6-alkylaryl or 6-alkylaralkylaminomethyl:

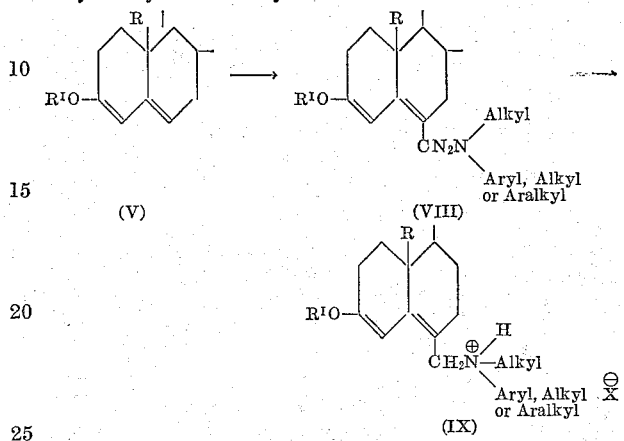

3-oxo-Δ⁴-steroid. The yields of alkylaryl (or alkylaralkyl) amines (VIII) from (V) are generally lower than those of the 6-dimethylaminomethyl derivatives (VI) so that the overall yields of 6-methylenic derivatives from enolic ethers (V) are generally lower employing salts of tertiary alkylaryl(alkaryl)amines of Category B.

The salts (IX) of tertiary amines (VIII) readily pass into 6-methylenic steroids including Formula II. The facility with which this reaction occurs in solution is such that, in general, it is preferred to convert the alkylaryl tertiary amines (VIII) into the 6-methylenic derivatives without isolating the intermediate salts (IX), but converting them in situ into the required final products including Formula II. Thus, for example, by merely warming 17β-acetoxy-3-ethoxy-6(N-methyl-N - phenylaminomethyl)-androsta-3,5-diene in acetic acid for a few minutes and pouring the solution into water 6-methylenetestosterone acetate may be obtained. Another procedure involves heating the foregoing amine with aqueous ethanolic hydrochloric acid under reflux for a few minutes and isolating the 6-methylene derivative by methods of prior art. Dialkylamine derivatives may be converted into 6-methylene derivatives by a procedure typified by heating an aqueous/alkanoic solution of the amine with a catalytic amount of an acid such as acetic acid. Other equivalent experimental procedures will be apparent to those skilled in the art.

The preparation of secondary amines required for conversion into salts of Category C may be achieved from 6-formyl derivatives (X), which, as described in our copending application No. 150,140 are prepared from 3-enol ethers (V) by treating them with the Vilsmeier reagent and hydrolysing the resulting iminium products

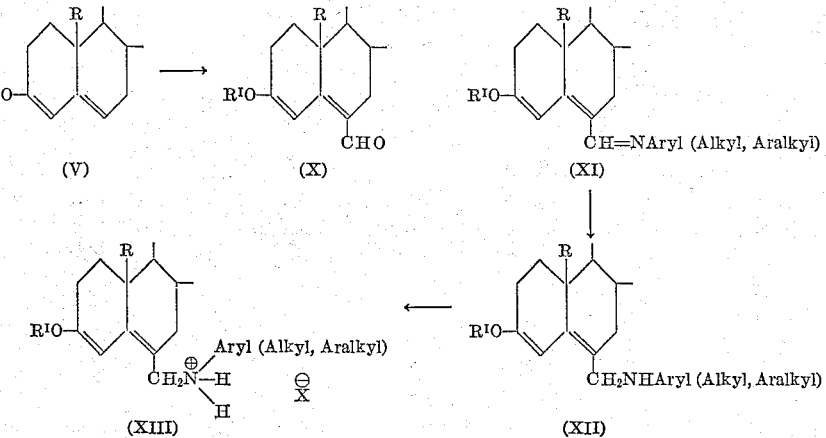

The 6-formyl derivaives (X) are treated with a primary amine, which may be an aliphatic or aromatic amine but is preferably a primary aromatic amine. The resulting anil (XI) may then be reduced, for example with lithium aluminium hydride, to the secondary amine (XII). The secondary amines so obtained are of value in their own right on account of their pharmacological properties. Thus they may affect the central nervous system and the blood pressure. The salts (XIII) of secondary amines (XII) readily pass in solution into 6-methylene steroids under experimental conditions generally applicable to salts of Category B as hereinabove described.

The preparation of N-oxides of the 3-enol ethers of 3-oxo-$\Delta^4$-6-aminomethyl steroids follows the methods of prior art (see, for example, Organic Reactions, Vol. XI, p. 378, Wiley & Sons, Inc., New York). Such N-oxides decompose readily to give the 6-methylenic-3-oxo-$\Delta^4$-steroids in general on simple warming of their solutions in the lower aqueous alcohols.

It will be apparent to those skilled in the art that the process of our invention has wide applicability to numerous steroidal starting materials. As described in our co-pending applications Nos. 150,140 filed November 6, 1961 and 168,827 filed January 25, 1962 now Pat. No. 3,084,159, and in the present application such starting materials as (VII), (IX) and (XIII) of the androstane, 9$\beta$,10$\alpha$-androstane, D-homoandrostane, 19-norandrostane, pregnane, 9$\beta$,10$\alpha$-pregnane, 19-norpregnane and spirostane series may be additionally substituted by:

Hydroxyl groups and functional derivatives thereof in positions 11, 12, 14, 15, 16 (including 16-hydroxymethyl), 17, 18, 20 and 21 (including the condensation products of $\alpha$-glycols with carbonyl components),
Carbonyl groups in positions 11, 12, 15, 16, 17, 18 and 20,
Carbalkoxy groups in positions 13, 16, 17 and in the side chain,
Alkyl groups other than at $C_4$ and $C_6$ and in particular methyl groups at 2, 11, 16, 17 and 21 and ethyl at 17,
Alkenyl groups containing up to 6 carbon atoms at $C_{17}$,
Methylene and ethylidene groups in positions 11, 16, 17 and 16-17,
Lactone, ether and spiroketal residues and in particular lactone and spirolactone .O.CO.CH$_2$CH$_2$. attached to $C_{17}$, etheric groups at position 16 and bridging positions 18 and 20. Spiroketal residues such as are present in spirostane,
Halogen groups Cl, Br and F in Rings C and D or in the side chain,
Unsaturated linkages at $C_{9(11)}$, $C_{11}$, $C_{14}$, $C_{15}$, $C_{16}$ and $C_{17(20)}$,
Ketol groups in positions 11–12, 16–17, 17–20 and 20–21,
Corticoid side chains which may be acylated, diacylated, condensed with carbonyl components such as formaldehyde or acetone (as 2,2-dimethoxypropane) or with ester components such as ethyl ortho-formate, ethyl acetoacetate or other functional derivatives thereof as may be known to those skilled in the art,
Epoxides in position 16–17.

It will be apparent to those skilled in the art that the elimination reaction which forms the subject of the present invention involves the decomposition of the cation (XIV)

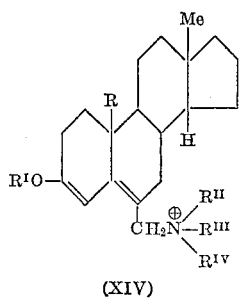

(XIV)

where R, $R^I$, $R^{II}$, $R^{III}$ and $R^{IV}$ are as hereinabove defined derived from the fully ionised salts including Formula I. It will consequently be apparent to those skilled in the art that the anion $\overset{\ominus}{X}$ associated with the cation (XIV) is unlikely to control per se the rate of the elimination reaction, but to influence it mainly by virtue of the solubility which it imparts to the steroidal starting materials including Formula I. It will be apparent to those skilled in the art that $\overset{\ominus}{X}$ must be so chosen as to avoid the production of marked alkalinity during the elimination reaction. Providing the requirement is satisfied that the steroidal salts which form the starting materials of the present invention including Formula I have sufficient solubility in the solvent or solvent system employed to ensure the success of the elimination reaction then the role of $\overset{\ominus}{X}$ in the elimination reaction is fulfilled and its identity becomes a matter of minor consequence.

The process of this invention is particularly useful and offers a distinct advantage over the process of application No. 150,177 for the preparation of 6-methylene-$\Delta^4$-3-oxo-steroids in those cases where the structure of the product includes a system sensitive to the acidic conditions of the process of application No. 150,177. Such systems include ketal groups and acetonides which systems are known to be hydrolysed by for example aqueous acetic acid but are stable under the conditions of the present invention. Thus for example 6-methylenecortisone 17$\alpha$,21-acetonide is readily prepared by heating 6-dimethylaminomethylcortisone 17$\alpha$,21-acetonide 3-enol methyl ether with methyl iodide in methanol, whereas in the process of application No. 150,177, 6-hydroxymethylcortisone 17$\alpha$,21-acetonide 3-enol methyl ether is converted by aqueous acetic acid into 6-methylene cortisone, purified as its 21-acetate.

The process of the invention may be used in the preparation of 6-methylene steroid derivatives of the following steroids and acyl derivatives thereof:

Testosterone, 2-methyltestosterone, 17$\alpha$-methyltestosterone and their 9(11)-dehydro-11-oxo and 11-hydroxy derivatives 17$\alpha$-acyloxyprogesterone and its 9(11)-dehydro, 11-oxo and 11-hydroxy derivatives
16-methyl-17$\alpha$-acyloxyprogesterone and its 9(11)-dehydro, 11-oxo and 11-hydroxy derivatives
21 - fluoro - 16 - methyl-17$\alpha$-acyloxyprogesterone and its 9(11)-dehydro, 11-oxo and 11-hydroxy derivatives
16-methylene-17$\alpha$-acyloxyprogesterone and its 9(11)-dehydro, 11-oxo and 11-hydroxy derivatives
21-fluoro-16-methylene-17$\alpha$-acyloxyprogesterone and its 9(11)-dehydro, 11-oxo and 11-hydroxy derivatives
17$\alpha$-acyloxy-16-ethylideneprogesterone
16$\alpha$,17$\alpha$ - dimethylmethylenedioxyprogesterone and its 9(11)-dehydro, 11-oxo and 11-hydroxy derivatives
Cortisone
16-Methylcortisone
21-methylcortisone
16-methylenecortisone
16$\alpha$-hydroxy cortisone and the (16$\alpha$,17$\alpha$)-acetonide thereof
Hydrocortisone
16-methylhydrocortisone
21-methylhydrocortisone
16-methylenehydrocortisone
16$\alpha$-hydroxyhydrocortisone and the (16$\alpha$,17$\alpha$)-acetonide thereof and the 9$\alpha$-fluoro derivatives of the above cortisones and hydrocortisones
17$\alpha$,21-dihydroxypregna-4,9(11)-diene-3,20-dione 16 - methyl - 17α,21-dihydroxypregna-4,9(11)-diene-3,20-dione
21 - methyl - 17α,21-dihydroxypregna-4,9(11)-diene-3,20-dione
16 - methylene - 17α,21-dihydroxypregna-4,9(11)-diene-3,20-dione
16α - hydroxy - 17α,21 - dihydroxypregna-4,9(11)-diene-3,20-dione and the (16,17) acetonide thereof
21 - fluoro - 17α-hydroxypregna-4,9(11)-diene-3,20-dione and the (16,17) acetonide thereof
21-fluoro-17α-hydroxypregn-4-ene-3,11,20-trione and the (16,17) acetonide thereof
21-fluoro-11,17α-dihydroxypregn-4-ene-3,20-dione and the (16,17) acetonide thereof
21-hydroxypregna-4,17(20)-dien-3-one
11-oxo-21-hydroxypregna-4,17(20)-dien-3-one
11,21-dihydroxypregna-4,17(20)-dien-3-one
9(11)-dehydro-21-hydroxypregna-4,17(20)-dien-3-one
3-oxopregna-4,17(20)-dienoic acid (esters)
3,11-dioxopregna-4,17(20)-dienoic acid (esters)
11-hydroxy-3-oxopregna-4,17(20)-dienoic acid (esters)
9(11) - dehydro - 3 - oxopregna - 4,17(20) - dienoic acid (esters)
21-fluoro-17α-acyloxyprogesterone and the 9(11)-dehydro, 11-oxo and 11-hydroxy derivatives thereof
Progesterone
16-methylprogesterone, 16,17-methyleneprogesterone and 16,17-ethylidene progesterone
11-oxoprogesterone
9(11)-dehydroprogesterone
21-methylprogesterone
Diosgenone
16-methyl-16,17-dehydroprogesterone
16-carbalkoxyprogesterone
16-hydroxymethylprogesterone
3-(3-oxo-17β-hydroxyandrost-4-en-17α-yl)propionic acid
21-fluoroprogesterone
Androst-4-ene-3,17-dione and its 2α-methyl, 16β-methyl and 2α,16β-dimethyl derivatives
Androst-4-ene-3,17-dione containing Ring C groups including Δ$^{9,11}$, 11-hydroxy and 11-oxo
Testololactone Following is a description by way of example of methods of carrying the invention into effect.

EXAMPLE 1
*Preparation of 17α,20:20,21-Bismethylenedioxy-6-Methylene-Pregn-4-Ene-3,11-Dione*

17α,20:20,21 - bismethylenedioxy-3-ethoxy-6-dimethylaminomethylpregna-3,5-dien-11-one (0.5 g., prepared as described in Example 1 of application No. 168,827, now Pat. 3,084,159) was converted into the methiodide by treatment with methyliodide in dry benzene, and this was heated at 100° C. in aqueous suspension for 2 hours. The resulting solid was collected and crystallised from methanol to give 17α,20:20,21-bismethylenedioxy-6-methylenepregn-4-ene-3,11-dione as laths, M.P. 201 to 203° C. $[α]_D^{21}+120°$ (c., 1.1 chloroform), identical with the material described in application No. 150,177 filed November 6, 1961.

EXAMPLE 2
*Preparation of 17α-Acetoxy-6,16-Dimethylenepregn-4-Ene-3,20-Dione*

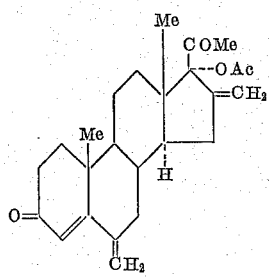

17α - acetoxy - 6 - dimethylaminomethyl-16-methylenepregna-3,5-dien-20-one (0.2 g. prepared as described in application No. 168,827) was converted into the methiodide by treatment with methyliodide in dry benzene and this was heated at 100° C. in water (10 ml.) and methanol (10 ml.) for 1 hour. The resulting solid was collected and crystallised from methanol to give 17α-acetoxy-6,16-dimethylenepregn-4-ene-3,20-dione as prisms, M.P. 224 to 225° C., $[α]_D^{20}+73°$ (c., 1.0 in chloroform), identical with the material described in application No. 150,177.

EXAMPLE 3
*Preparation of 17α,20:20,21-Bismethylenedioxy-11β-Hydroxy-6-Methylenepregn-4-En-3-One*

17α, 20:20,21 - bismethylenedioxy - 6 - dimethylaminomethyl-3-ethoxypregna-3,5-dien-11β-ol (0.7 g. prepared by the process of Example 38 of application No. 168,827, now Pat 3,084,159) was converted into the methiodide by treatment with methyl iodide in dry benzene, and this was heated at 100° C. in water (25 ml.) and methanol (5 ml.) for ½ hour. The resulting solid was collected and crystallised from dichloromethane/methanol to give 17α,20:20, 21 - bismethylenedioxy-11β-hydroxy-6-methylenepregn-4-en-3-one as needles, M.P. 224 to 226° C., $[α]_D^{23}+168°$ (c., 0.75 in chloroform), identical with the material described in application No. 157,177.

EXAMPLE 4
*Preparation of 17β-Acetoxy-2α-Methyl-6-Methyleneandrost-4-En-3-One*

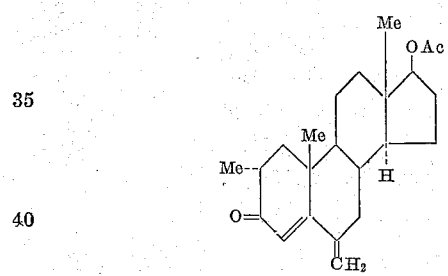

17β - acetoxy - 6 - dimethylaminomethyl - 3 - ethoxy-2α-methylandrosta-3,5-diene (0.5 g. prepared as described in Example 43 of application No. 168,827, now Pat. No. 3,084,159) was converted into the methiodide by treatment with methyl iodide in dry benzene at 40° C. for 3 hours. The methiodide was then heated at 100° C. in water (25 ml.) for 2 hours and the precipitated solid was collected. Crystallisation from dichloromethane/methanol gave 17β - acetoxy - 2α - methyl - 6 - methyleneandrost-4-en-3-one as plates, M.P. 179 to 181° C., $[α]_D^{25} +245°$ (c., 0.75 in chloroform), $$\lambda_{max.}^{EtOH} \ 257 \ to \ 260 \ m\mu \ (\epsilon \ 11,120)$$

identical with the material prepared according to the process of application No. 150,177.

EXAMPLE 5
*Preparation of 21-Acetoxy-6-Methylenepregn-4-Ene-3,20-Dione*

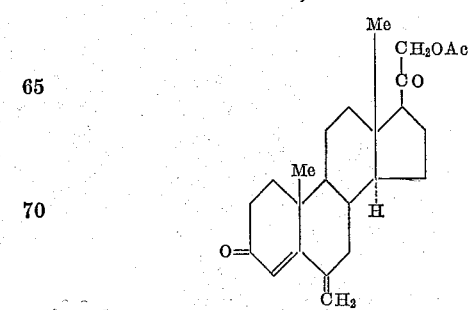

A solution of 21-acetoxy-6-dimethylaminomethyl-3- ethoxypregna-3,5-dien-20-one methiodide (1 g. prepared from the corresponding amine of Example 42 of application No. 168,827 by treatment with methyl iodide in dry benzene) and sodium acetate (0.5 g.) in methanol (50 ml.) was heated under reflux for 2 hours. The solution was poured into water and the steroidal material was isolated with ether. Crystallisation of the residue obtained by evaporation of the ether from aqueous methanol gave 21 - acetoxy-6-methylenepregn-4-ene-3,20-dione as needles, M.P. 112 to 114° C., $[\alpha]_D^{26}$ +306° (c., 0.73 in chloroform), $\lambda_{max.}^{EtOH}$ 260 m$\mu$ ($\epsilon$ 11,700)

EXAMPLE 6

Preparation of 6-Methylenepregn-4-Ene-3,20-Dione

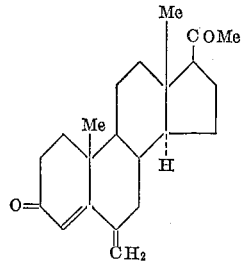

6 - dimethylaminomethyl - 3 - ethoxypregna - 3,5 - dien-20-one (1 g., prepared by the process of application No. 168,827, now Pat. No. 3,084,159) was converted into the corresponding methobromide by treatment with methyl bromide in ether-hexane, and this was heated under reflux in methanol (50 ml.) for 1 hour. The product was isolated by dilution with water and crystallised from aqueous acetone to give 6-methylenepregn-4-ene-3,20-dione as plates, M.P. 133 to 135° C., $[\alpha]_D^{22}$ +373° (c., 0.6 in chloroform), identical with material prepared by the process of application No. 150,177.

EXAMPLE 7

Preparation of 16α,17α-Isopropylidenedioxy-6-Methylene-pregn-4-En-3,20-Dione

6 - dimethylaminomethyl - 3 - ethoxy - 16α,17α - isopropylidenedioxypregna-3,5-dien-20-one (0.5 g.) (prepared as described in Example 4 of application No. 168,827, now Pat. No. 3,084,159) in benzene (20 ml.) was treated with methylbromide (0.5 g.) and allowed to stand for 4 hours. The resulting gel was freed from solvent as far as possible under reduced pressure, and the residue crushed to a fine powder. The crude methobromide was heated with water (20 ml.) at 100° C. for 4 hours. The precipitated material was filtered off and purified from methanol to give 16α,17α-isopropylidene-dioxy-6-methylenepregn-4-ene-3,20-dione, needles, M.P. 240° C. with decomposition, identical with an authentic specimen.

EXAMPLE 8

Preparation of 6-Methylenepregn-4-En-3,11,20-Trione-17α,21-Diol Diacetate

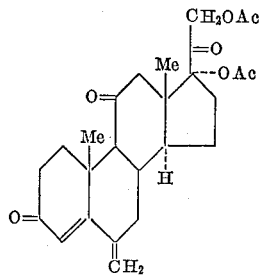

6 - dimethylaminomethyl - 3 - methoxypregna - 3,5-dien-11,20-dione-17α,21-diol diacetate (16 parts, prepared as described in Example 46 of application No. 168,827, now Pat. No. 3,084,159) was dissolved in a mixture of ethyl acetate (600 parts), methanol (100 parts) and iodomethane (30 parts) and left for 2 days. Evaporation to dryness gave the methiodide as a gelatinous solid. The foregoing methiodide (1 part) was maintained at 100° C. in water (30 parts) for four hours, then cooled and filtered. The solid so obtained was recrystallised from moist methanol to give the product, 6-methylenepregn-4-en-3,11,20-trione-17α,20-diol diacetate, M.P. 192 to 196° C.

EXAMPLE 9

Preparation of 6-Methylene-16-Methyl-16-Dehydro-progesterone

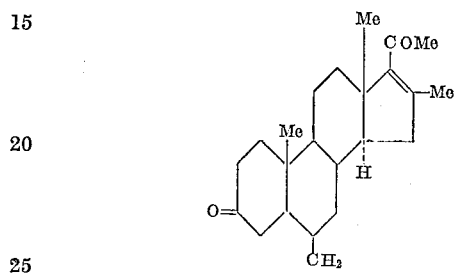

6 - dimethylaminomethyl-3-methoxy-16-methylpregna-3,5,16-trien-20-one was prepared (as described in Example 45 of application No. 168,827, now Pat. No. 3,084,159, for the 3-ethoxy compound) from 3-methoxy-16-methylpregna-3,5,16-trien-20-one (7.48 parts). The crude amine was dissolved in dry benzene (100 parts), iodomethane (5 parts) added, and the solution left for 12 hours. Filtration and washing of the product with acetone gave the methiodide, M.P. 193 to 194° C. (dec.). A suspension of the foregoing methiodide (1 part) was suspended in water (40 parts) and maintained at 100° C. for a period of 4 hours, with occasional swirling. Then the suspension was cooled and filtered, and the solid so obtained recrystallised from moist methanol to give the product, 6-methylene-16-methyl-16-dehydrophogesterone, M.P. 131 to 133° C., and finally 147 to 150° C. after repeated recrystallisations from disopropyl ether.

EXAMPLE 10

Preparation of 17β-Hydroxy-17α-Methyl-6-Methyl-eneandrosta-4-En-3-One

A solution of 6-dimethylaminomethyl-3-methoxy-17α-methyl-17β-propionoxyandrosta-3,5-diene borane (10 g., prepared as described in Example 7 of application No. 168,827, now Pat. No. 3,084,159) in piperidine (100 ml.) was boiled under reflux for 4 hours. After cooling, some insoluble material was removed by filtration and the mother-liquor was evaporated to dryness under reduced pressure. Crystallisation of the residue gave 6-dimethylaminomethyl - 3 - methoxy-17α-methyl-17β-propionoxyandrosta-3,5-diene.

A stirred solution of the foregoing compound (8 g.) in dry tetrahydrofuran (250 ml.) was treated with lithium aluminium hydride (8 g.) and the stirred mixture boiled under reflux for 2 hours. The mixture was cooled, excess lithium aluminium hydride decomposed by cautious addition of water and the product isolated with ether. Crystallisation gave 6-dimethylaminomethyl-17β-hydroxy-3-methoxy-17α-methylandrosta-3,5-diene.

A solution of the foregoing compound (5 g.) and methyl iodide (8 ml.) in dry benzene (100 ml.) was left at room temperature for 3 hours. The resulting methiodide was collected, suspended in water (200 ml.) and methanol (80 ml.) and the mixture boiled under reflux for 6 hours. The mixture was cooled and the product isolated with ether. Crystallisation from ether-light petroleum (B.P. 40 to 60° C.) gave 17β-hydroxy-17α-methyl-6-methyl-eneandrosta-4-en-3-one as rosettes of needles, M.P. 140 to 145° C. $[\alpha]_D^{21}$+245° (c., 0.56 in chloroform), $\gamma_{max.}^{Nujol}$ 1650, 1610, 1590 cm.$^{-1}$

EXAMPLE 11

*Preparation of 6-Methylene-17β-Propionoxy-17α-Vinyl androst-4-Ene-3-One*

A solution of 3 - ethoxy-17β-propionoxy-17α-vinylandrosta-3,5-diene (6.6 g. prepared as described in Example 29 of application No. 150,140) in dry ethylenedichloride (30 ml.) and dry pyridine (0.5 ml.) was added to a stirred ice-cooled suspension of the Vilsmeier reagent [prepared from a solution of dimethylformamide (4.5 ml.) in ethylenedichloride (25 ml.) and a solution of phosgene in ethylenedichloride (21 ml., 10%)] and the mixture stirred at room temperature for two hours. After phenazone (6 g.) had been added, a solution of sodium borohydride (750 mg.) in dry pyridine (30 ml.) was added during 10 minutes. The mixture was stirred at room temperature for 20 minutes, poured into water and the neutral product extracted with ether. The aqueous solution was treated with sodium carbonate (3 g.) and the product isolated with ether to give 3-ethoxy-6 - dimethylaminomethyl - 17β - propionoxy-17α-vinylandrosta-3,5-diene as a pale yellow gum, $\gamma_{max.}^{Nujol}$ 1730, 1650 and 1610 cm.$^{-1}$ A solution of the foregoing compound (5 g.) in dry benzene (50 ml.) was treated with methyl iodide (5 ml.) and the mixture left at room temperature for 42 hours, when the crude methiodide was filtered off.

A solution of the foregoing methiodide (3 g.) in water (50 ml.) and methanol (50 ml.) was boiled under reflux for 5 hours, cooled and the product isolated with ether. Crystallisation from aqueous acetone gave 6-methylene - 17β-propionoxy-17α-vinylandrost-4-ene-3-one, needles M.P. 129 to 130° C. $[\alpha]_D^{24}+261°$ (c., 0.4 in chloroform), $\gamma_{max.}^{Nujol}$ 1730, 1680, 1620 and 1600 cm.$^{-1}$

EXAMPLE 12

*Preparation of 6-Methylene-17β-Propionoxy-17α-Prop-1'-Ynylandrost-4-En-3-One*

A solution of 3-ethoxy-17β-propionoxy-17α-prop-1'-ynyl-androsta-3,5-diene (6 g. prepared as described in Example 23 of application No. 150,140) in dry ethylene dichloride (30 ml.) and dry pyridine (0.5 ml.) was added to a stirred, ice-cooled suspension of the Vilsmeier reagent [prepared from a solution of dimethylformamide (3.3 ml.) in ethylene dichloride (30 ml.) and a solution of phosgene in ethylenedichloride (12%, 21 ml.)] and the mixture stirred at room temperature for 1 hour. After the addition of phenazone (5.9 g.) a solution of sodium borohydride (750 mg.) in dry pyridine (30 ml.) was added during 10 minutes. The mixture was stirred at room temperature for 20 minutes, poured into water and the neutral product extracted with ether. The aqueous solution was treated with sodium carbonate (3.2 g.) and the product isolated with ether to give 3-ethoxy-6-dimethylaminomethyl-17β-propionoxy - 17α - prop-1'-ynyl-androsta-3,5-diene as a light brown gum, $\gamma_{max.}^{Nujol}$ 1730, 1650 and 1610 cm.$^{-1}$ A solution of the foregoing compound (4 g.) in benzene (20 ml.) was treated with methyl iodide (5 ml.) and the mixture left at room temperature for 24 hours, when the crude methiodide was filtered off.

A solution of the foregoing methiodide (2 g.) in water (50 ml.) and methanol (30 ml.) was boiled under reflux for 4 hours, cooled and the product isolated with ether. Crystallisation from aqueous methanol gave 6-methylene-17β-propionoxy-17α-prop-1'-ynylandrost-4-en-3-one, needles M.P. 141 to 142° C., $[\alpha]_D^{24}$ +161° (c., 0.99 in chloroform), $\gamma_{max.}^{Nujol}$ 1730, 1680, 1625 and 1600 cm.$^{-1}$

EXAMPLE 13

*Preparation of 17α-Acetoxy-21-Fluoro-6-Methylenepregn-4-Ene-3,20-Dione*

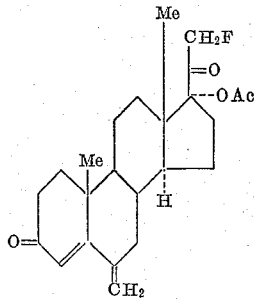

17α-acetoxy-21-fluoropregn-4-ene-3,20-dione (3.5 g.) (Dodson et al., J.A.C.S., 1960, 82, 2325) and methyl ortho-formate (3.6 ml.) were dissolved in dioxan (20 ml.). Toluene p-sulphonic acid (0.5 g.) dissolved in dioxan (10 ml.) was added and after 30 minutes the product was isolated with ether and crystallised from methanol containing a few drops of pyridine to give 17α-acetoxy-21-fluoro-3-methoxypregna-3,5-dien-20-one.

17α-acetoxy-21-fluoro-3-methoxypregna - 3,5 - dien-20-one (5 g.) dissolved in ethylenedichloride (50 ml.) was added to the complex prepared from phosgene (1.7 g.) in ethylenedichloride (17 ml.) and dimethylformamide (2.5 ml.) in anhydrous conditions. Phenazone (4 g.) was added, followed by sodium borohydride (0.38 g.) in pyridine dried over sodium hydride. The product was isolated with ether and the residue was dissolved in benzene (100 ml.) and methyl bromide (10 ml.) was added. The mixture was kept at 40° C. for 24 hours and the solids were collected, dried in air and crystallised from methanol to give the methobromide of 17-acetoxy-6-dimethylaminomethyl-21-fluoro-3-methoxypregna-3,5-dien-20-one.

The quaternary bromide (5 g.) was heated in water (100 ml.) on a steam-bath for 4 hours and the solids collected by filtration. Crystallisation from methanol gave 17α-acetoxy-21-fluoro-6-methylenepregn - 4 - ene - 3,20-dione, needles M.P. 205 to 207° C., $[\alpha]_D^{25}+272°$ (c., 0.93 in CHCl$_3$), $\lambda_{max.}^{EtOH}$ 260 mμ ($\epsilon$ 10,770)

EXAMPLE 14

*Preparation of 17α-Acetoxy-16α-Methyl-6-Methylenepregn-4-Ene-3,20-Dione*

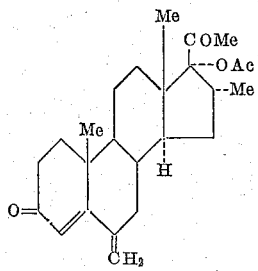

17α-acetoxy-16α-methyl-3-methoxypregna - 3,5 - dien-20-one was converted to the methobromide of 17α-acetoxy-6-dimethylaminomethyl - 16α - methyl - 3 - methoxypregna-3,5-dien-20-one by the process described in Example 13.

This quaternary bromide (2.4 g.) was heated in water (50 ml.) on a steam bath for 4 hours and the solids were collected and crystallised from aqueous methanol to give 17α-acetoxy-16α-methyl-6-methylenepregn - 4 - ene - 3,20-dione, needles, M.P. 173 to 175° C. $[\alpha]_D^{26}$ +223° (c., 0.78 in CHCl$_3$), $\lambda_{max.}^{EtOH}$ 251 mμ ($\epsilon$ 10,840)

EXAMPLE 15

*Preparation of 17α-Acetoxy-16β-Methyl-6-Methylenepregn-4-Ene-3,20-Dione*

Treatment of 17α-acetoxy-16β-methylpregn-4-ene-3,20- dione by the process described in Example 13 gave 17α-acetoxy-16β-methyl-6-methylenepregn-4-ene-3,20-dione.

EXAMPLE 16

*Preparation of 17α-Acetoxy-6-Methyleneprogesterone*

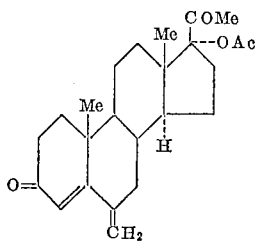

17α-acetoxy-3-ethoxy - 6 - trimethylammoniummethyl-pregna-3,5-dien-20-one iodide (prepared as described in application No. 168,794 filed January 20, 1962) (1 g.) suspended in water (50 ml.) was heated at 90° C. for 4 hours, when it slowly dissolved and was replaced by a crystalline precipitate. This was purified from ethyl acetate to give 17α-acetoxy-6-methyleneprogesterone, M.P. 240 to 244° C., $[\alpha]_D^{24}+226°$ (c. 0.9 in CHCl$_3$).

EXAMPLE 17

*Preparation of 6-Methylenetestosterone Acetate*

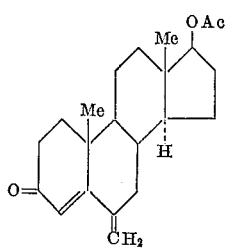

17β-acetoxy-3-ethoxy - 6 - trimethylammoniummethyl-androsta-3,5-diene iodide (5 g.) (prepared from the 6-dimethylaminomethyl derivative of Example 8 of application No. 168,827 now Pat. No. 3,084,159 by reaction with methyl iodide in anhydrous benzene) and ammonium chloride (5 g.) were heated in water (100 ml.) for 1 hour at 100° C. The precipitated product was purified from aqueous methanol to give 6-methylenetestosterone acetate, M.P. 141 to 143° C., $[\alpha]_D^{24}+270°$ (c. 0.85 in chloroform).

EXAMPLE 18

*Preparation of 6-Methylene Testosterone Acetate*

17β-acetoxy - 6 - dimethylaminomethyl-3-ethoxyandrosta-3,5-diene methacetate was prepared from the corresponding methiodide (1 g., prepared as described in Example 17) and silver acetate (0.3 g.) in methanol (20 ml.). On heating for ½ hour at 90° C. in 50% aqueous methanol it was converted into 6-methylene testosterone acetate M.P. 141 to 143° C., $[\alpha]_D^{23}+270°$ (c. 0.9 in chloroform), identical with the material prepared in Example 17.

EXAMPLE 19

*Preparation of 6-Methylene Testosterone Acetate*

A solution of 17β-acetoxy-6-dimethylaminomethyl-3-ethoxyandrosta-3,5-diene methosulphate (0.5 g., prepared from the free amine of Example 8 of application No. 168,827 now Pat. No. 3,084,159 by treatment with dimethyl sulphate in ether-hexane) and sodium acetate (0.25 g.) in water (10 ml.) was maintained at 100° C. for ½ hour. The precipitated solid was collected and crystallized from aqueous methanol to give 6-methylene testosterone acetate as needles, M.P. 141 to 144° C., identical with the material prepared in Example 17.

EXAMPLE 20

*Preparation of 6-Methylene Androst-4-Ene-3,17-Dione*

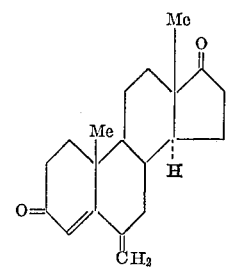

3 - ethoxy-6-dimethylaminomethylandrosta-3,5-dien-17-one (10 g., as prepared in Example 23 of application No. 168,827) now Pat. No. 3,084,159 in anhydrous ether (100 ml.) was treated with methyl bromide (5 ml.) in a stoppered flask for 30 hours at 35° C. The precipitated methobromide was collected and dried at 45° C. The product was heated in suspension in refluxing toluene (200 ml.) for 3 hours, the mixture was cooled, stirred with anhydrous sodium sulphate and charcoal, filtered, and the solvent removed in vacuo. The solid residue was purified from acetone/hexane to give 6-methylene androst-4-ene-3,17-dione in prisms, M.P. 154 to 156° C., $[\alpha]_D^{25}+387°$ (c. 0.98 in CHCl$_3$), $\lambda_{max.}^{EtOH}$ 260.5 mμ (ϵ 11,140)

EXAMPLE 21

*Preparation of 21-Acetoxy-17α-Hydroxy-6-Methylene-pregna-4,9(11)-Diene-3,20-Dione*

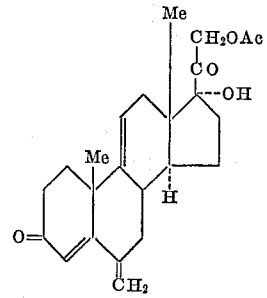

21-acetoxy-6-trimethylaminomethyl - 17α - hydroxy-3-methoxypregna-3,5,9(11)-trien-20-one iodide (1 g., as prepared by the process of application No. 168,794 i.e. the amine (Example 27) dissolved in hot benzene was treated with excess methyl iodide at 40 to 50° C. for 5 hours. After allowing to cool, the quaternary salt was collected and used directly) was treated with water (10 ml.) and benzene (20 ml.) under reflux for 4 hours. The benzene layer was separated and washed and the solvent removed. Purification of the residue from ethanol gave 21-acetoxy - 17α - hydroxy - 6 - methylenepregna-4,9(11)-diene-3,20-dione in flakes, M.P. 165 to 172° C., $[\alpha]_D^{23}+208°$ (c. 0.84 in CHCl$_3$).

EXAMPLE 22

*Preparation of 6-Methylene Cortisone Acetate*

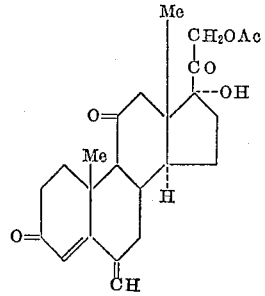

6-dimethylaminomethylcortisone acetate 3-enol methyl ether (10 g. as prepared in Example 40 of application No. 168,827 now Patent No. 3,084,159) was dissolved in benzene (200 ml.) containing methyl bromide (3 ml.). After 24 hours, the precipitated methobromide was collected and treated with methanol (100 ml.) containing sodium acetate (2 g.) under reflux for 2 hours isolated with methylene chloride and purified from acetone/hexane to give 6-methylene cortisone acetate, prisms from acetone/hexane, M.P. 186 to 190° C., $[\alpha]_D^{24} +343°$ (c. 0.74 in CHCl$_3$).

EXAMPLE 23

*Preparation of 17α-Hydroxy-21-Methyl-6-Methylenepregn-4-Ene-3,11,20-Trione*

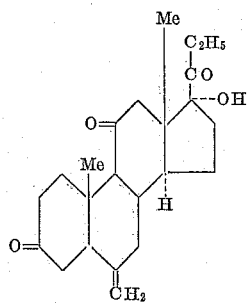

17α-hydroxy-6-trimethylaminomethyl - 3 - methoxy-21-methylpregna-3,5-diene-11,20-dione iodide (prepared as in Example 23 of application No. 168,794) was treated by the process of Example 21 and gave 17α-hydroxy-21-methyl-6-methylene-pregna-4-ene-3,11,20-trione.

EXAMPLE 24

*Preparation of 6-Methylene-Androst-4-Ene-3,17-Dione*

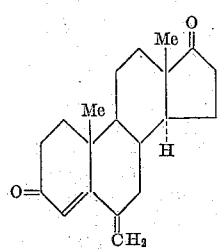

3-benzyloxy-6 - dimethylaminomethylandrosta-3,5-dien-17-one (as prepared in Example 22 of application No. 168,827, now Patent No. 3,084,159) was treated by the process of Example 20 and gave 6-methylene-androst-4-ene-3,17-dione, M.P. 154 to 156° C.

EXAMPLE 25

*Preparation of 6-Methyleneandrost-4-Ene-3,17-Dione*

6-dimethylaminomethyl - 3-methoxy-androsta-3,5-dien-17-one methobromide (0.5 g.) was heated in dimethylformamide (20 ml.) at 100° C. for 1 hour. The product was 6-methyleneandrost-4-ene-3,17-dione, M.P. 154 to 156° C., identical with that prepared in Example 20.

EXAMPLE 26

*Preparation of 6-Methyleneandrost-4-Ene-3,17-Dione*

6 - dimethylaminomethyl - 3 - methoxy - androsta - 3,5-dien-17-one methobromide (0.5 g.) was heated in dimethylsulphoxide at 80° C. for 1 hour. The product was 6-methyleneandrost-4-ene-3,17-dione, M.P. 154 to 156° C., identical with that preferred in Example 20.

EXAMPLE 27

*Preparation of 6-Methyleneandrost-4-Ene-3,17-Dione*

6 - dimethylaminomethyl - 3 - methoxy - androsta - 3,5-dien-17-one methobromide (0.5 g.) was heated in acetonitrile at 100° C. for 1 hour. The product was 6-methyleneandrost-4-ene-3,17-dione, M.P. 154 to 156° C., identical with that prepared in Example 20.

EXAMPLE 28

*Preparation of 6-Methyleneandrost-4-Ene-3,17-Dione*

6 - dimethylaminomethyl - 3 - methoxy - androsta - 3,5-dien-17-one methobromide (0.5 g.) was heated in dioxan at 100° C. for 1 hour. The product was 6-methyleneandrost-4-ene-3,17-dione, M.P. 154 to 156° C., identical with that prepared in Example 20.

EXAMPLE 29

*Preparation of 6-Methylene-25D-Spirost-4-En-3-One*

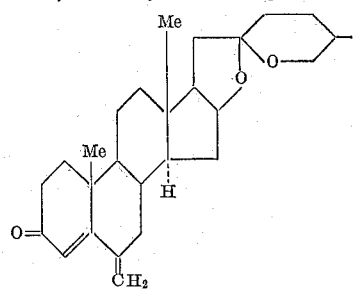

A solution of 3-ethoxy-25D-spirosta-3,5-diene (4.6 g., prepared as described in Example 7 of our copending application No. 150,140) in dry ethylenedichloride (25 ml.) containing a few drops of dry pyridine was added at 0° C. to a stirred suspension of the complex obtained from dimethylformamide (2.3 g.) and phosgene (1.8 g.) in ethylene dichloride (25 ml.). The mixture was stirred at room temperature for 2 hours, treated with phenazone (3.2 g.), and then a dry solution of sodium borohydride (0.4 g.) in pyridine. After a further 20 minutes at room temperature the mixture was poured into aqueous sodium carbonate and the product isolated with ether. Crystallisation gave 6 - dimethylaminomethyl - 3 - ethoxy - 25D-spirosta-3,5-diene, $\lambda_{max.}$ 251 m$\mu$ (log 4.26). This compound (5 g.) in dry benzene (50 ml.) was treated with methyl iodide (5 ml.) and the mixture kept at room temperature for 24 hours. Filtration gave the methiodide which was used without further purification.

The foregoing methiodide (2 g.) and water were heated for 4 hours at 100° C. The product was collected and purified from methylene chloride/methanol to give 6-methylene-25D-spirost-4-en-3-one in dense plates, M.P. 204 to 205° C., not depressed in admixture with an authentic specimen.

EXAMPLE 30

*Preparation of 6-Methylene-19-Nor-Testosterone Acetate*

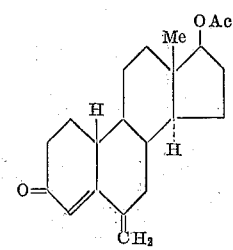

6 - dimethylaminomethyl - 19 - nor - 3 - ethoxy - androst-3,5-dien-17β-acetate borane (2.0 g., as prepared in Example 17 of application No. 168,827, now Patent No. 3,084,159) was dissolved in piperidine (10 ml.) and the solution was heated under reflux for four hours. Piperidine was distilled off under reduced pressure, the residue was dissolved in benzene and the solution filtered. Methyl iodide (3 ml.) was added to the filtrate which was allowed to stand overnight. The precipitate of 6-dimethylaminomethyl - 19 - nor - 3 - ethoxy - androst-3,5-dien-17β-acetate methiodide was collected and suspended in water (100 ml.) to which has been added sodium acetate (1 g.) and a few drops of ethanol. This suspension was heated on the steam bath under reflux for about an hour, and allowed to cool. The precipitate of 6-methylene-19-nor-testosterone acetate was collected, washed with water and purified by crystallisation from hexane/benzene $\lambda_{max.}$ 264 to 266 m$\mu$ ($\epsilon$ =11,310) $\gamma_{max.}^{CS_2}$ 1320, 1285, 1244, 1209, 1046, 1022, 909, 894. $\gamma_{max.}^{CCl_4}$ 1741, 1677, 1624, 1595.

EXAMPLE 31

*Preparation of 6-Methylene Testosterone*

17$\beta$ - acetoxy - 6 - formyl-3-methoxyandrosta-3,5-diene (5 g.) in methanol (120 ml.) was treated with redistilled aniline (1.5 g.) and heated under reflux for 15 minutes. The crystalline precipitated thus obtained was collected by filtration and purified from methylene chloride and methanol (containing a trace of pyridine) to give 17$\beta$-acetoxy - 3-methoxy-6-phenyliminomethylandrosta-3,5-diene, yellow needles, M.P. 222 to 230° C., $[\alpha]_D^{17}$—236° (c. 0.58 in dioxan), $\lambda_{max.}^{EtOH}$ 234 to 235 m$\mu$ ($\epsilon$ 15,620) and 334 to 337 m$\mu$ ($\epsilon$ 17,490), $\gamma_{max.}^{Nujol}$ 1730, 1640, 1565, 1260, 1040, 765 and 692 cm.$^{-1}$.

The foregoing anil (600 mg.) in dry dioxan (25 ml.) was added to a suspension of lithium aluminium hydride (600 mg.) in dioxan (20 ml.) and the mixture heated at 100° C., for 10 minutes whilst stirring. The reaction mixture was cooled in ice and excess hydride decomposed by cautious addition of water. The product was isolated with ether and purified from ether-petrol. 3-methoxy-6-phenylaminomethylandrosta-3,5-dien-17$\beta$-ol formed microcrysals, M.P. 80 to 87° C., $[\alpha]_D^{25.5}$—127.1 (c. 0.90 in dioxan), $\lambda_{max.}^{EtOH}$ 253 m$\mu$ ($\epsilon$ 27,550), $\gamma_{max.}^{Nujol}$ 1650, 1625, 1600, 1500, 1200, 750 and 692 cm.$^{-1}$.

The foregoing compound (200 mg.) was dissolved in glacial acetic acid (1 ml.) with gentle warming. Water was added dropwise and the crystalline product purified from aqueous ethanol. 6-methylene testosterone formed needles M.P. 175° C.

EXAMPLE 32

*Preparation of 6-Methylene Testosterone Actate*

17$\beta$ - acetoxy - 3 - methoxy-6-phenyliminomethylandrosta-3,5-diene (1.08 g., prepared as in Example 31) in dry dioxan was hydrogenated employing palladium on charcoal (100 mg. of 5%) as catalyst. After uptake of hydrogen was complete, the catalyst was filtered off and the filtrate evaporated to dryness under reduced pressure. The resulting gum was chromatographed onto alumina. Elution with benzene gave fractions which crystallised after prolonged trituration with petrol. Purification from acetone-petrol gave 17$\beta$-acetoxy-3-methoxy-6-phenylaminomethylandrosta-3,5-diene, small prisms M.P. 125 to 130° C., $\lambda_{max.}^{EtOH}$ 252.5 m$\mu$ ($\epsilon$ 27,020), $\gamma_{max.}^{Nujol}$ 1730, 1655, 1610, 1505, 1250, 1030, 750 and 696 cm.$^{-1}$.

The foregoing compound (500 mg.) was dissolved in glacial acetic acid (2.5 ml.) with gentle warming and water added dropwise until crystallisation occurred. Purification from aqueous methanol gave 6-methylene testosterone acetate, flakes M.P. 140 to 141° C.

EXAMPLE 33

*Preparation of 6-Methylenetestosterone β-Phenyl Propionate*

Testosterone β-phenylpropionate was converted into the 3-methylenol ether by standard procedures and this ether submitted to reaction with the Vilsmeier reagent as described in Example 29. The resulting amine was quaternated with methyl iodide in benzene solution and the quaternary salt treated by the procedure of Example 4 to give 6-methylenetestosterone β-phenyl propionate, needles from methanol/methylene chloride, M.P. 188 to 189° C., $[\alpha]_D^{26}$+215 (c. 1.07 in CHCl$_3$), $\lambda_{max.}$ 261 m$\mu$ ($\epsilon$=11,770).

EXAMPLE 34

*Preparation of 6-Methylene-19-Nor-Testosterone*

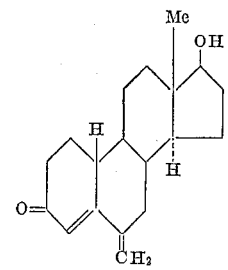

A solution of hydrogen chloride in absolute ethanol (1 N; 1.64 ml.) was added to a mixture of ethyl orthoformate (4.1 ml.), absolute ethanol (7 ml.), 19-nor-testosterone (5.0 g.) and anhydrous benzene (41 ml.) and the mixture was heated under reflux for 2 hours and cooled. A solution of sodium ethoxide made by dissolving sodium (0.4 g.) in ethanol (20 ml.) was added quickly, with vigorous stirring and the resulting solution was washed with water, dried over potassium carbonate and evaporated at reduced pressure. The residue of 3-ethoxy-19-nor-androsta-3,5-dien-17$\beta$-ol was triturated with hexane, dried by suction and used without further purification for the next step.

A solution of dimethylformamide (1.58 ml.) in ethylenedichloride (10 ml.) was stirred at 0° C., with exclusion of moisture, during dropwise addition of a solution of phosgene in ethylenedichloride (10% w/v; 10 ml.). After stirring at 0° C. for a further 10 minutes, 3-ethoxy-19-nor-androsta-3,5-dien-17$\beta$-ol (3.02 g.) in dry ethylenedichloride (25 ml.) was added, and the mixture was stirred at room temperature for 3 hours. A solution of lithium borohydride (0.118 g.) in anhydrous tetrahydrofuran (4 ml.) was added slowly, and the resulting solution was poured into dilute sodium carbonate solution. Ether extraction, washing with water, drying over sodium sulphate, treatment with charcoal and stripping yielded an oil which was dissolved in anhydrous ether, a small amount of sparingly soluble solid being removed by filtration. Methyl bromide (3 ml. measured at 0° C.) was added, and the solution was maintained at 40° C. in a sealed flask for 3 days. The resulting precipitate of 3-ethoxy-6-trimethylaminomethyl - 19 - nor - androsta-3,5-dien-17$\beta$-ol bromide was collected, washed with petroleum ether, dried, and used without further purification.

3 - ethoxy - 6 - trimethylaminomethyl - 19 - nor-androsta-3,5-dien-17$\beta$-ol bromide (2.5 g.) was heated on the steambath for four hours with water (60 ml.) and benzene (60 ml.). After cooling, the benzene layer was separated, dried over sodium sulphate and evaporated under reduced pressure. The residue of 6-methylene-19-nor-testosterone was purified by recrystallisation from a mixture of ether and hexane.

EXAMPLE 35

*Preparation of 6-Methylene-17β-Phenylpropionoxy-19-Nor-Androst-4-En-3-One*

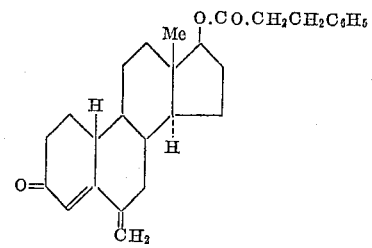

To a stirred solution of 3-methoxy-oestra-2,5(10)-dien-17$\beta$-ol (8.0 g.) in pyridine (120 ml.), cooled in ice/salt freezing mixture, was added dropwise 3-phenyl-propionyl chloride (8.0 ml.), the temperature of the solution not being allowed to exceed 0° C. After stirring at 0° C. for a further 30 minutes, the solution was allowed to stand overnight at room temperature. Crushed ice was then added in portions, and the mixture was extracted with ether, the ether solution being washed with water, dried over sodium sulphate and evaporated to dryness under reduced pressure. Chromatography on neutral alumina, eluting with benzene, followed by recrystallisation from methanol/ether, yielded 3-methoxy-17β-phenylpropionoxy-oestra-2,5(10)-diene, M.P. 98 to 99° C., sufficiently pure for the next stage. A solution of dimethylformamide 3.2 ml.) in ethylenedichloride (20 ml.) was stirred at 0° C., with exclusion of moisture, during the dropwise addition of a solution of phosgene in ethylenedichloride (10% w./v.; 20.5 ml.). After stirring for a further 10 minutes at 0° C., a solution of 3-methoxy-17β-phenyl-propionoxy-oestra-2,5(10)-diene (6.25 g.) in dry ethylenedichloride (50 ml.) was added quickly, and the solution was stirred at room temperature for 3 hours. A solution of lithium borohydride (0.264 g.) in anhydrous tetrahydrofuran (7 ml.) was added slowly, and the resulting solution was poured into dilute sodium carbonate solution. Ether extraction, washing with water, drying over sodium sulphate, treatment with charcoal and stripping yielded an oil, which was dissolved in anhydrous ether (200 ml.), a small amount of undissolved solid being filtered off. Methyl bromide (5 ml.; measured at 0° C.) was added to the filtrate, which was then maintained at 40° C. in a sealed flask for 3 days. The resulting precipitate of 3 - methoxy - 17β - phenylpropionoxy - 6 - trimethyl-aminomethyl-19-nor-androsta-3,5-diene bromide was collected, washed with petroleum ether, dried and used in the next step without further purification.

3 - methoxy - 17β - phenylpropionoxy - 6 - trimethyl-amino-methyl-19-nor-androsta-3,5-diene bromide (6.0 g.) was heated under reflux on the steam-bath with water (150 ml.) and benzene (150 ml.) for 4 hours. After cooling, the benzene layer was separated, dried over sodium sulphate and evaporated under reduced pressure. The resulting 6-methylene-17β-phenylpropionoxy-19-nor-androst-4-en-3-one solidified on standing, and was purified by recrystallisation from benzene/hexane.

EXAMPLE 36

*Preparation of 9α-Fluoro-6-Methylene-Hydrocortisone Acetate*

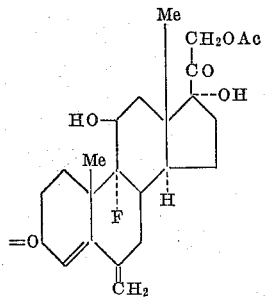

9α-fluorohydrocortisone acetate 3-enol methyl ether (cf. Smith et al. J. Org. Chem. 1961, 26, 974) (10 g.) in dry ethylenedichloride (500 ml.) containing pyridine (1 ml.) was added to the Vilsmeier reagent prepared from phosgene (1.9 g.) in dry ethylene dichloride (18 ml.) and dimethylformamide (3.3 ml.) in dry ethylenedichloride (20 ml.). After stirring for 1½ hours at room temperature phenazone (5 g.) was added, followed by lithium borohydride (0.38 g.) in anhydrous tetrahydrofuran (20 ml.) added dropwise with vigorous stirring over 10 minutes. The mixture was poured into aqueous potassium hydrogen carbonate, and the organic layer was washed with 10 x 200 ml. water, the washings being re-extracted with ethylenedichloride (50 ml.). The organic layer was dried over sodium sulphate and the solvents removed under reduced pressure to give crude 21 - acetoxy - 9α - fluoro - 6 - dimethylaminomethyl - 11β, 17α - dihydroxy - 3 - methoxypregna - 3,5 - dien - 20 - one.

The foregoing crude product, in benzene (100 ml.) was treated with methyl bromide (10 ml.) in a stoppered flask for 24 hours at 30° C. The precipitated methobromide was collected and washed with ether.

The crude air-dried methobromide was suspended in water (100 ml.) containing methanol (40 ml.) was heated at 60 to 80° C. for 2 hours. The product was extracted into ethyl acetate which was washed, dried ($Na_2SO_4$) and evaporated. Purification from acetone/hexane gave 9α-fluoro-6-methylene-hydrocortisone acetate $\lambda_{max}$. 260.5 m$\mu$ ($\epsilon$ 11,100) in ethanol.

EXAMPLE 37

*Preparation of 17α-Acetoxy-6-Methyleneprogesterone*

17α - acetoxy - 6 - dimethylaminomethyl-3-ethoxypregna-3,5-dien-20-one (1 g.) (prepared as described in Example 8 of application No. 168,827) in methanol (20 ml.) was treated with methyl iodide (1 ml.) under reflux for 1 hour. The solution was then concentrated and allowed to cool, when 17α-acetoxy-6-methyleneprogesterone, M.P. 238 to 244° C. was obtained.

EXAMPLE 38

A solution of 17β - acetoxy-3-ethoxy-6-(N - methyl-N-phenylaminomethyl)-androsta-3,5-diene (0.3 g.) in methanol (75 ml.) was treated with concentrated hydrochloric acid (2 ml.) for 5 minutes at room temperature. Addition of water precipitated 6-methylene testosterone, M.P 173 to 175° C., identical with the sample prepared in Example 31.

EXAMPLE 39

A solution of 17β - acetoxy-3-ethoxy-6-(N-methyl-N-phenylaminomethyl)-androsta-3,5-diene (0.3 g.) in methanol (75 ml.) was treated with 10% aqueous hydrochloric acid (0.25 ml., 1 mol.) for 5 minutes at room temperature. Precipitation with water gave 6-methylene testosterone acetate, M.P. 141° C., identical with the sample prepared as in Example 17.

EXAMPLE 40

*Preparation of 16α,17α - Epoxy-6-Methylenepregn-4-Ene-3,20 Dione*

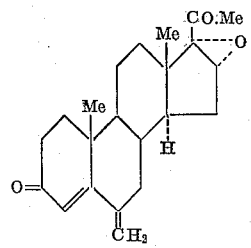

16α,17α-epoxy-3-methoxy-6-dimethylaminomethylpregna-3,5-dien-20-one (5 g.) in methanol (80 ml.) was treated with methyl iodide (5 ml.) under reflux for ¾ hour. The excess of methyl iodide was then allowed to boil off and water was added to the solution until crystallisation commenced. The product was purified from aqueous methanol to give 16α,17α-epoxy-6-methylene-pregn-4-ene-3,20-dione in prisms, M.P. 189 to 190° C.

EXAMPLE 41

17α-acetoxy-6-dimethylaminomethyl-3-methoxypregna-3,5-dien-20-one (5 g.) in methanol (100 ml.) was treated with 30% hydrogen peroxide (20 ml.) for 4 days at room temperature. Water (500 ml.) was added, and the mixture was extracted with ether (100 ml.) which was rejected. The aqueous layer was extracted with methylene chloride (6 x 25 ml.), and the combined extract was washed with water (25 ml.), dried ($Na_2SO_4$) and the solvent evaporated under reduced pressure. The residue was triturated with acetone to give the N-oxide hydrate, M.P. 116 to 119° C.

The N-oxide hydrate (1 g.) in water (25 ml.) was stirred and heated under reflux for 2 hours, cooled, and the solids collected and purified from methanol to give 17α - acetoxy - 6 - methyleneprogesterone, M.P. 240 to 244° C.

EXAMPLE 42

17α - acetoxy-6-dimethylaminomethyl-3-ethoxypregna-3,5-dien-20-one (1 g.) in methanol (20 ml.) and 30% hydrogen peroxide (4 ml.) was stirred at 50 to 55° C., for 5 hours diluted with water (5 ml.), cooled, and the solids purified from methanol, to give 17α - acetoxy-6-methyleneprogesterone, M.P. 240 to 244° C.

EXAMPLE 43

17α-acetoxy-6-dimethylaminomethyl-3-methoxypregna-3,5-dien-20-one (1 g.) in 80% aqueous methanol (40 ml.) and acetic acid (0.2 ml.) was heated under reflux for 4 hours, concentrated to about 15 ml., and allowed to cool. The crystalline product was purified from methanol to give 17α-acetoxy-6-methyleneprogesterone, M.P. 240 to 244° C.

We claim:

1. A process for the preparation of a compound selected from the group consisting of 6-methylene-3-oxo-$\Delta^4$ steroids of the androstane, 19-norandrostane, pregnane, 19-norpregnane and spirostane series, comprising: contacting with an aqueous medium a corresponding steroid compound of said series having in rings A and B of the steroid nucleus the following structure:

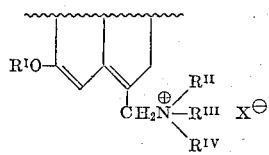

in which X is an anion, $R^I$ is selected from the group consisting of alkyl, hydroxyalkyl, cycloalkyl and aralkyl, and $R^{II}$, $R^{III}$ and $R^{IV}$ are selected from the combinations consisting of:

(A) $R^{II}$ is selected from the group consisting of alkyl, cycloalkyl, aryl and aralkyl and $R^{III}$ and $R^{IV}$ are H;

(B) $R^{II}$ is alkyl, $R^{III}$ is selected from the group consisting of aryl, aralkyl and alkyl and $R^{IV}$ is selected from the group consisting of H and oxygen;

(C) $R^{II}$, $R^{III}$ and $R^{IV}$ are alkyl; and (D) $R^{II}$ and $R^{III}$ together with the nitrogen atom form a ring structure selected from the group consisting of pyrrolidine, piperidine and morpholine and $R^{IV}$ is selected from the group consisting of alkyl and oxygen.

2. A process as claimed in claim 1 wherein the steroid starting material is contacted with an aqueous medium selected from the group consisting of water alone and water in admixture with an organic solvent.

3. A process as claimed in claim 1 wherein the aqueous medium is water in admixture with an organic solvent selected from the group consisting of the lower aliphatic alcohols and ketones.

4. A process as claimed in claim 1 wherein $R^{II}$, $R^{III}$ and $R^{IV}$ of the starting material are each methyl and X is an anion selected from the group consisting of I, Br and $MeSO_4$.

5. A process as claimed in claim 1 wherein the steroid starting material is heated at 50° C., to 100° C. in said aqueous medium.

6. A process as claimed in claim 1 wherein the steroid starting material is formed by reacting a 3-enol ether of a corresponding 3-oxo-$\Delta^4$-6-dimethylaminomethyl steroid in an organic solvent medium with a quaternating agent selected from the group consisting of methyl iodide, methyl bromide and methyl sulphate.

7. A process as claimed in claim 1 wherein $R^{II}$, $R^{III}$ and $R^{IV}$ of the steroid starting material is the combination (B) in which $R^{IV}$ is oxygen and this material is heated at 35° C. to 100° C. in an aqueous medium selected from the group consisting of water alone and water in admixture with a water-miscible organic solvent.

8. 6-methylene-19-nortestosterone.

9. 6-methylene-19-nortestosterone-β-phenyl propionate.

10. 6-methylene-19-nortestosterone acetate.

11. 6-methylene-androstenedione.

12. 6-methylenedesoxycorticosterone acetate.

13. 17α - acetoxy - 21-fluoro-6-methylenepregn-4-ene-3,20-dione.

References Cited in the file of this patent
UNITED STATES PATENTS
2,980,711     Colton _____ Apr. 18, 1961